United States Patent [19]

Herman et al.

[11] Patent Number: 5,246,472
[45] Date of Patent: Sep. 21, 1993

[54] APPARATUS FOR FILTERING ENGINE EXHAUST

[75] Inventors: John T. Herman, Dellwood; Wayne M. Wagner; Mervin E. Wright, both of Apple Valley; Bruce B. Hoppenstedt, Bloomington; James A. LeBlanc, Eden Prairie, all of Minn.

[73] Assignee: Donaldson Company, Inc., Minneapolis, Minn.

[21] Appl. No.: 37,709

[22] Filed: Mar. 25, 1993

Related U.S. Application Data

[63] Continuation of Ser. No. 758,627, Sep. 12, 1991, abandoned, which is a continuation-in-part of Ser. No. 497,446, Mar. 20, 1990, abandoned.

[51] Int. Cl.$^5$ ............................................. B01D 27/00
[52] U.S. Cl. ..................................... 55/276; 55/429; 55/498; 55/510; 55/DIG. 30; 60/311
[58] Field of Search ............... 55/276, 429, 476, 480, 55/498, 510, DIG. 30; 60/311; 95/273

[56] References Cited

U.S. PATENT DOCUMENTS

| | | | |
|---|---|---|---|
| 2,428,223 | 9/1947 | Johnson | 214/113 |
| 2,732,026 | 1/1956 | Folts | 181/57 |
| 2,924,296 | 2/1960 | Cook | 183/79 |
| 2,962,121 | 11/1960 | Wilber | 55/480 |
| 3,147,097 | 9/1964 | Aguas | 55/276 |
| 3,154,388 | 10/1964 | Purse | 55/DIG. 30 |
| 3,222,140 | 12/1965 | Scivally et al. | 55/DIG. 30 |
| 3,596,441 | 8/1971 | Lundahl | 55/376 |
| 3,605,940 | 9/1971 | Christensen | 60/311 |
| 3,680,659 | 8/1972 | Kasten | 181/36 A |
| 3,738,089 | 6/1973 | Brill | 55/310 |
| 3,822,531 | 7/1974 | Wisnewski et al. | 60/311 |
| 3,857,688 | 12/1974 | Wisnewski | 60/311 |
| 3,918,945 | 11/1975 | Holloway et al. | 60/311 |
| 3,942,600 | 3/1976 | DePriester et al. | 180/64 A |
| 3,960,509 | 6/1976 | Abriany | 55/DIG. 30 |
| 3,987,867 | 10/1976 | Moller | 181/56 |
| 4,124,357 | 11/1978 | Akimoto et al. | 55/DIG. 30 |
| 4,149,862 | 4/1979 | Sewell, Sr. | 55/DIG. 30 |
| 4,338,284 | 7/1982 | Ignoffo | 55/DIG. 30 |
| 4,419,113 | 12/1983 | Smith | 55/DIG. 30 |
| 4,424,882 | 1/1984 | Moller | 181/131 |
| 4,482,368 | 11/1984 | Roberts | 55/480 |
| 4,693,337 | 9/1987 | Timmermeister | 55/276 |
| 4,706,454 | 11/1987 | Smith, Jr. | 60/311 |
| 4,712,643 | 12/1987 | Iles et al. | 181/231 |
| 4,732,594 | 3/1988 | Mizrah et al. | 55/523 |
| 4,732,678 | 3/1988 | Humbert, Jr. | 210/440 |
| 4,758,256 | 7/1988 | Machado | 55/480 |
| 4,842,623 | 6/1989 | Zundel | 55/262 |
| 4,842,624 | 6/1989 | Barton | 55/291 |
| 4,853,007 | 8/1989 | Leonhard et al. | 55/337 |
| 4,913,712 | 4/1990 | Gabathuler et al. | 55/482 |
| 4,954,255 | 9/1990 | Muller et al. | 55/498 |
| 4,969,328 | 11/1990 | Kammel | 55/DIG. 30 |

OTHER PUBLICATIONS

Revue Technique Automobile, vol. 42, No. 483, Sep. 1987, (Boulogne-Billancourt, FR), "Un filtre d'échappement adaptable sur véhicule circulant dans un lieu clos".

Primary Examiner—Scott Bushey
Attorney, Agent, or Firm—Merchant, Gould, Smith, Edell, Welter & Schmidt

[57] ABSTRACT

An engine exhaust filtering system (10) filters carbon particles from exhaust gases. A length of pipe (12) leads from the engine to promote the agglomeration of carbon particles in the exhaust gases. The exhaust gases then pass through a diffuser (36) having a series of chokes (38) to promote further turbulence and agglomeration of the carbon particles. A diffuser (36) directs particles for uniform distribution over a filter cartridge (22). After passing through the filter cartridge (22), the filtered exhaust gases are then expelled into the atmosphere. The filter cartridge (22) is removable and can be reused after the particles are removed.

13 Claims, 3 Drawing Sheets

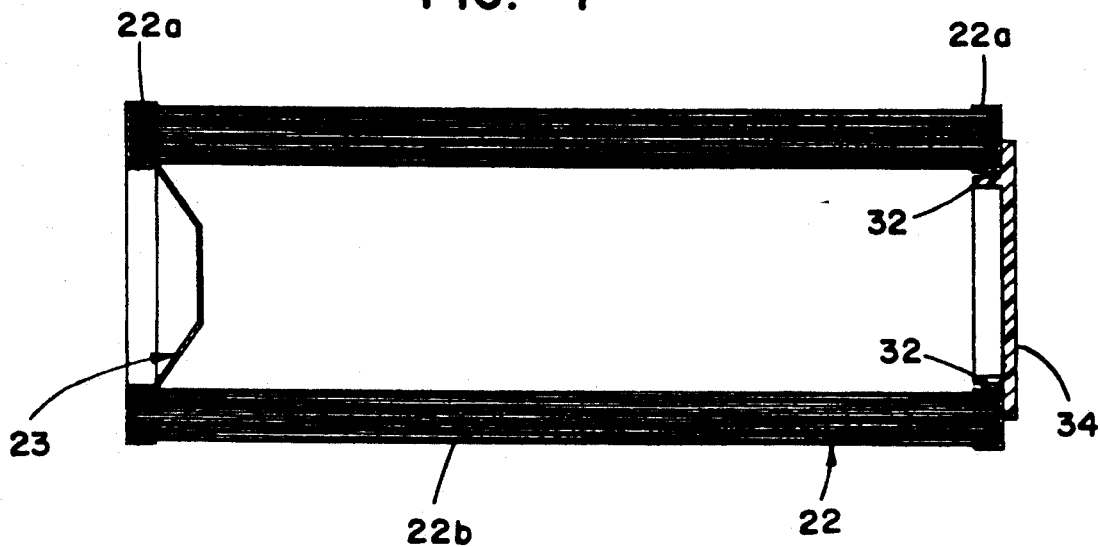

APPARATUS FOR FILTERING ENGINE EXHAUST

This is a continuation, of application Ser. No. 07/758,627, filed Sep. 12, 1991 which is a CIP of application Ser. No. 07/497,446, filed Mar. 20, 1990, both now abandoned.

BACKGROUND OF THE INVENTION

The present invention relates generally to a process for filtering engine exhaust and an engine exhaust filtering system. More particularly, this invention relates to an exhaust filtering system suited for use with diesel engines.

As concern for the environment increases, greater attention is being given to systems for eliminating damaging discharges from internal combustion engines. In the workplace, pollution created by combustion engines threatens the health of many workers, as the carbon contained in the exhaust may be carcinogenic. The problem is especially troublesome in enclosed environments such as warehouses or factories wherein diesel fork lifts are frequently used. Fork lifts are often operated in a cycling manner, that is, at maximum power for short spurts. At maximum power, the highest percentage of diesel particulate material is exhausted, exposing the operators to health risks. Thus, it can be seen that a system for reducing this harmful exhaust is needed. Prior filter units have generally been too expensive and difficult to service. In addition, prior filtering devices have not worked effectively during cycling when carbon exhaust is at a maximum.

The prior art, reflected by U.S. Pat. No. 3,738,089 to Brill, teaches an exhaust gas filter. Exhaust passes from the interior of a canister outward through a perforated wall and into a fiber blanket type filter medium located between the canister and a surrounding supporting shell and exits from openings at the rear of the device. A bypass valve opens to allow a direct passage of the exhaust gases through the canister and out to the atmosphere when the engine is under maximum power conditions so that the filter is ineffective in applications wherein the engine frequently cycles up to maximum power. Brill utilizes a deep pad type filter which clogs easily from diesel particulate material and is not easily cleanable.

In Mizrah et al., U.S. Pat. No. 4,732,594, there is described a process for scrubbing exhaust gases from diesel engines using an open pore ceramic foam filter. This type of filter requires temperatures above 550° C., or temperatures above 400° C. when the filter has a catalyst coating, to regenerate the filter by combusting the soot. In many applications, the filter will not reach the high temperatures required for regeneration so that a separate heat generation device must be added, thereby making the cost prohibitive.

In addition, the prior art also teaches several types of spark arresters generally located inside of a muffler to trap carbon particles.

None of the prior art devices adequately filter diesel particulate matter which is exhausted from diesel engines. The carbon particles in diesel exhaust collide and join each other to form larger clumps, having very low densities, on the order of 0.04–0.05 grams/cc. The dynamic equivalence, that is the solid particle that exhibits the same efficiency as the carbon clumps, is approximately 1.2 micrometers for diesel particulate matter. This microscopic size of the particulate matter makes filtering extremely difficult and containment and handling of the filtered material very burdensome.

The present invention addresses the problems associated with filtering exhaust from internal combustion engines. It is apparent that an improved system for filtering exhaust is needed for the health and safety of vehicle operators and those working nearby. The present invention solves these problems and others associated with filtering exhaust from diesel engines.

SUMMARY OF THE INVENTION

In contrast to prior art exhaust filters, the present invention uses agglomeration and diffusion before filtering exhaust gases. Both steps contribute to the greater efficiency in removing carbon from the exhaust gases. The present invention remains effective in filtering out the increased amount of diesel particulate material expelled at maximum power and is more suitable for use during cycling.

According to the present invention, exhaust gases flow through an intake pipe of substantial length to promote the agglomeration of carbon particles in the exhaust gases. As the length of the intake pipe increases, the number of collisions between carbon particles and subsequent agglomerations also increases. The larger agglomerated carbon particles and the exhaust gases may then pass through a diffuser manifold in which is located a number of diffuser chokes to add further turbulence in the flow and, therefore, further agglomeration of the carbon particles. The diffuser manifold then distributes the agglomerated carbon particles and the exhaust gases uniformly on a filter cartridge. The carbon particles are removed from the exhaust gases by the filter material, and the clean exhaust is expelled into the atmosphere.

The filter cartridge uses a pleated filter material for trapping the diesel particulate material. The pleats also provide surface area for depositing the diesel soot, which further aids filtering. The cartridge has inside-out flow so that the diesel soot is deposited on the inside of the cartridge. The cartridge may be capped and removed for cleaning and reuse. With the ends capped, the particulate material is contained and does not pose a health hazard while removed from the filtering system.

These and various other advantages and features of novelty which characterize the invention are pointed out with particularity in the claims annexed hereto and forming a part hereof. However, for a better understanding of the invention, its advantages and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the accompanying drawings, in which like reference numerals indicate corresponding elements throughout the views:

FIG. 4 shows a cross-sectional view of the filter cartridge removed from the filtering unit and capped and showing sections of the filter at various places and stages of loading.

DETAILED DESCRIPTION OF THE PREFERRED EMBODIMENT

Figure 1:
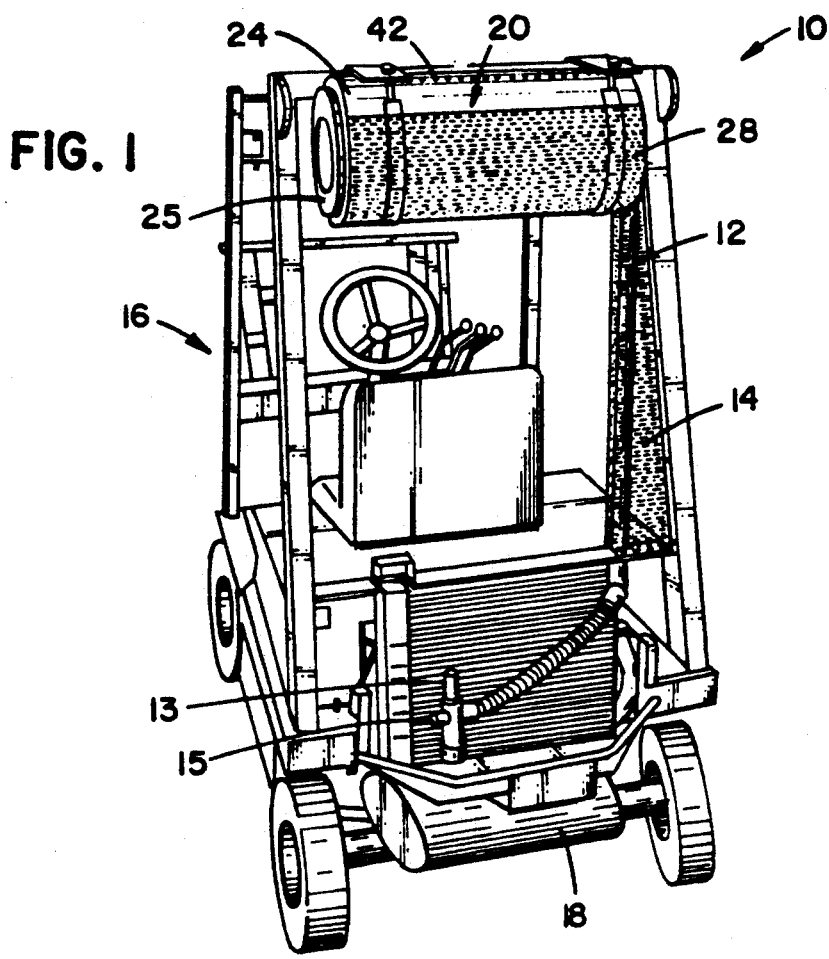
FIG. 1 shows a perspective view of an engine exhaust filtering system mounted on a forklift with the forklift counterweight removed to expose the rear of the engine compartment.

FIG. 1 shows an engine exhaust filtering system, generally designated 10, attached to and drawing exhaust off a muffler 18 from the diesel engine (not shown) for filtering diesel particulate material, commonly called diesel soot, from the exhaust. In one embodiment, the exhaust filtering system 10 has an agglomerating pipe 12 surrounded by a protective heat guard 14. The filtering system 10 is shown mounted on a diesel forklift 16, however, it can be appreciated that the filtering system 10 could be used with other engines as well.

The agglomerating pipe 12 leads from the muffler 18 up to a filtering unit 20 located at the upper portion of the frame of the forklift 16, so that the field of vision of an operator is not limited. The pipe 12 may also have pressure and temperature safety valves 13 and 15 respectively. Should the back pressure become over 15 kPa or the temperature rise above 235° C., exhaust will be released through the valves 13 and/or 15 as high temperatures may harm the system gaskets and seals and high backpressures may damage the engine. The filtering unit 20 is encompassed by a filter housing 24 which in turn, is surrounded by heat guard 28 to prevent burns.

Figure 3:
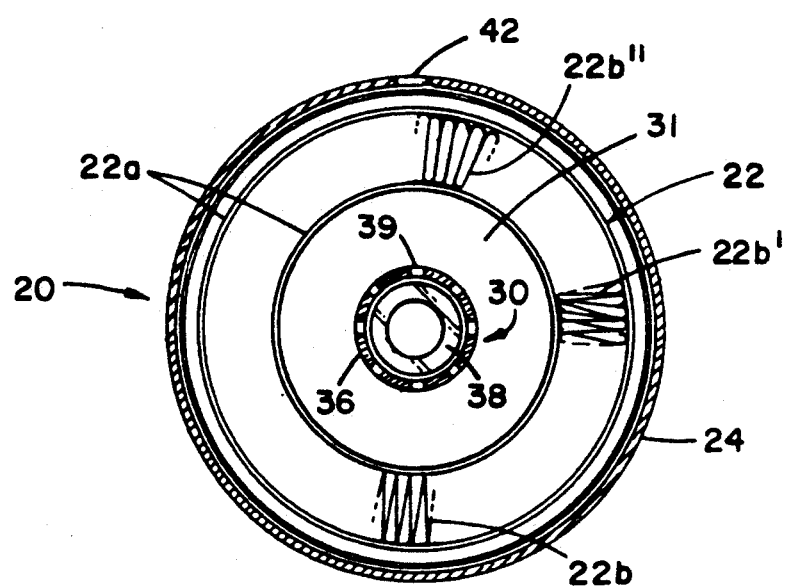
FIG. 3 shows a cross-sectional view of the filtering unit taken along section 3—3 of FIG. 2 and showing the filter under different loads and at different locations.
Figure 2:
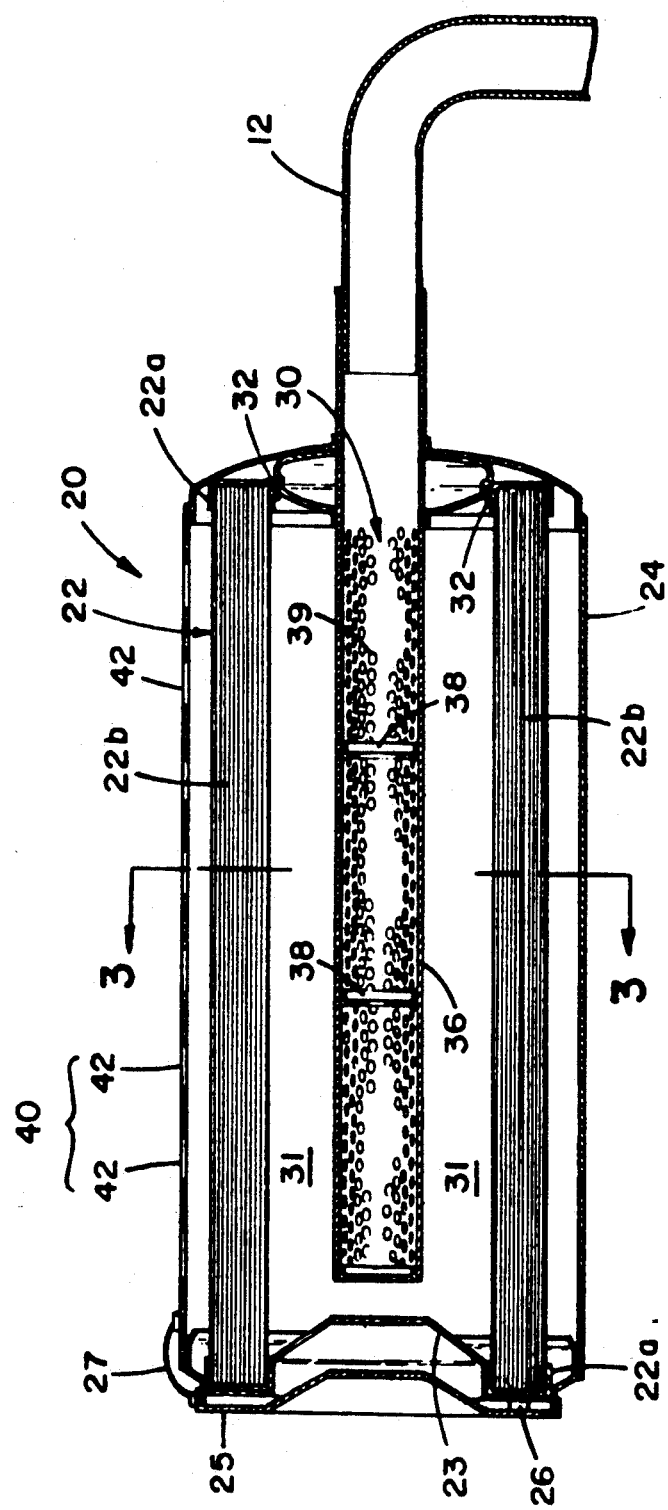
FIG. 2 shows a longitudinal sectional view of the filtering unit of the engine exhaust filtering system shown in FIG. 1.

As shown in FIG. 2, in one embodiment, the agglomerating pipe 12 attaches to diffuser 30 and the end of the filter housing 24. The agglomerating pipe 12 directs the flow of the agglomerated carbon particles and the exhaust gases into an elongated diffuser manifold 36. A number of diffuser chokes 38 are spaced along the diffuser manifold 36. Each choke 38 has a reduced opening which restricts the flow along the diffuser manifold 36 to increase turbulence. The agglomerated carbon particles and exhaust gases then pass radially outward through a multiplicity of diffuser ports 39, only several of which are illustrated in FIG. 2, and into cavity 31 between the diffuser 30 and the filtering unit 20, as also shown in FIG. 3.

In the preferred embodiment, a cylindrical filter cartridge 22 encompasses the diffuser manifold 36 as shown in FIG. 2. The filter cartridge 22 has end rings 22a at the ends of cylinder filter material 22b and an end cap 23 covering one ring. In the preferred embodiment, the filter cartridge 22 has an annular configuration and the filter material 22b has pleated construction, as shown in FIG. 3. The normal pleat configuration is indicated at 22b wherein the filter has no loading from diesel particulate material. The filter material at a pleatloc is indicated at 22b'. A fully-loaded filter is shown at 22b". The loaded filter 22b" has the pleats spread apart due to loading from diesel particulate material being trapped. It is important that the filter material provide sufficient surface area to hold the diesel soot without too many pleats. A maximum of 5 pleats per inch is preferred as this provides sufficient space to hold the soot between the pleats. The surface area must also be sized so that the air flow velocity is not more than 0.76 meters/min. Greater velocities reduce filtering effectiveness as the high flow rate could cause a pressure buildup. The engine should not have a back pressure from the exhaust due to the filter greater than 15 kPa as greater pressure may damage the engine.

The filter housing 24 surrounds the filter cartridge 22. Discharge 40 in the housing 24 allows the filtered gases to pass to the atmosphere. In the preferred embodiment, the discharge 40 has a row of exit ports 42 passing the gases out away from the operator.

The filter cartridge 22 engages the filter housing at the agglomerating pipe inlet end with a gasket 32 and has the end cap 23 at the opposite end to form a chamber 31. In the preferred embodiment, the end cap 23 is covered by a heat shield cap 25 which prevents workers from touching the hot surface of the end cap 23. The heat shield cap 25 is attached to the end cap 23 by a plurality of magnets 26. In addition, a security loop 27 is attached at one end to the heat shield cap 25 and at the other end to the filter housing 24 to prevent the heat shield cap 25 from being misplaced when removed during the cartridge cleaning process, explained hereinafter.

In operation, exhaust gases containing pollutants pass from the muffler 18 to the exhaust filtering system 10 into the agglomerating pipe 12. As exhaust gases pass along the agglomerating pipe 12, turbulent flow causes the carbon particles in the gases to collide and agglomerate prior to filtering, providing for greater filtering efficiency, as the larger particles passing through filter material are easier to trap. It can be appreciated that the agglomerating pipe 12 should be made as long as is practical to achieve greater agglomeration. Turbulence and additional length for agglomeration to occur may be added by winding the agglomerating pipe 12 back and forth.

Gases pass up the agglomerating pipe 12 to the filtering unit 20 and enter the diffuser 30. The gases proceed through the diffuser manifold 36 and are directed through the diffuser chokes 38, to create turbulence and promote further agglomeration. In the preferred embodiment, the openings of the diffuser chokes 38 vary in size, with the area of these openings generally decreasing along the direction of flow to promote uniform exhaust from the diffuser manifold 36. The diffuser chokes 38 and diffuser ports 39 dispense the exhaust gases and carbon particles uniformly throughout the chamber 31 so that the particles are distributed over the inner surface area of the filter cartridge 22. The reverse flow from inside-out through the filter medium provides for containment of the diesel particulate material on the inside of the filter cartridge 22, as explained hereinafter.

As the gases proceed through the filter cartridge 22, diesel particulate material is left on the inner surface of the filter material 22b. The clean exhaust gases then exit the filter unit 20 into the atmosphere through the exit ports 42. In the preferred embodiment, the exit ports 42 direct the gases upward and away from the vehicle operator.

The filter cartridge 22 is removable and reusable. The cartridge 22 is removed by detaching heat shield cap 25 from the end of the filter housing 24. The filter cartridge 22 can then be slid out of the filter housing 24 along the diffuser manifold 36. When the cartridge 22 is removed, vigorous agitation or air cleaning will loosen the carbon particles that are attached to the inside of the cartridge 22. When the particles have been removed, the cartridge 22 may be inserted back into the filter housing 24. The cartridge 22 may be cleaned and reused over and over. A small amount of carbon particles may remain on the filter cartridges 22, but the filtering performance does not decrease and may actually improve since the soot filters additional soot. With use, filtering efficiencies as high as 99.5% have been achieved.

As shown in FIG. 4, to contain the diesel particulate material when the cartridge 22 is removed, a cap 34 is placed on one end ring 22a against gasket 32. As the filter cartridge 22 is pulled from the housing 24, the loose particulate material inside the cartridge will fall onto cap 23. Cap 34 is then placed on the other end to form a closed container. This seals off the filter cartridge 22 so that none of the diesel soot may escape. With both ends capped and the particulate material trapped on the inside of the filter cartridge 22, the diesel soot is fully contained. This prevents workers from being exposed to the diesel particulate material when handling the cartridges 22 for cleaning and reuse.

Even though numerous characteristics and advantages of the present invention have been set forth in the foregoing description, together with details of the structure and function of the invention, it is to be understood that the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An engine exhaust filtering system for filtering diesel particulate material from exhaust gases, comprising:
   a) agglomerating means for promoting the agglomeration of carbon particles in diesel engine exhaust gas;
   b) diffusing means receiving gases from said agglomerating means for uniformly distributing the exhaust gases leaving said diffusing means; and,
   c) filtering means receiving exhaust gases from said diffusing means for removing agglomerated carbon particles from the exhaust gases, including a cleanable and reusable cylindrical filter cartridge having inside-out flow, wherein the filter cartridge includes a fixed cartridge cap at a first end and a removable cartridge cap at a second end and a filter housing surrounding said filter cartridge having a removable housing cap facilitating easy removal of the filter cartridge; wherein the fixed cartridge cap and the removable cap enclose the cartridge when the filter cartridge is removed from the housing so that the particulate material is trapped inside of the cartridge when the cartridge is removed from the housing.

2. An engine exhaust filtering system as claimed in claim 1 wherein said filter housing and said agglomerating means are surrounded by a heat shield to prevent burns.

3. An engine exhaust filtering system as claimed in claim 1 further comprising a muffler located at an end of said agglomerating means opposite from said filtering means.

4. An engine exhaust filtering system as claimed in claim 1 wherein said filter cartridge is made of a pleated, fibrous cleanable filter material.

5. An engine exhaust filtering system according to claim 1, wherein the filter cartridge has expandable pleated fiber material receiving the particulate material loading the filter.

6. A filtering system according to claim 5, wherein the filter cartridge further comprises end rings covering each end of the pleated fiber material.

7. A filtering system according to claim 6, wherein expandable pleats of the pleated fiber material are spaced no greater than 5 pleats per inch.

8. A filtering system according to claim 7, wherein the filter cartridge includes sufficient surface area so that the face velocity of the exhaust at the cartridge is not more than 0.75 meters/minute.

9. An engine exhaust filtering system, comprising:
   a) particle agglomerating means attached to an engine exhaust for facilitating agglomeration of exhaust particulates; and,
   b) a housing containing a removable reusable filter cartridge means for receiving exhaust gases from the agglomerating means, wherein the filter cartridge means has a cylindrical annular configuration receiving exhaust through an inlet in the interior of the cartridge from the agglomerating means and a cartridge end cap at a first end of the cartridge and a removable cartridge end cap mounting to cover the inlet at a second end of the cartridge when the cartridge is removed from the housing, so that the filter cartridge is enclosed when the removable end cap is attached; wherein the filter cartridge has expandable pleated fiber material so that the pleats expand as particulate material loads the filter.

10. A filtering system according to claim 9, wherein the filter cartridge means further comprises end rings covering at least one end of the pleated fiber material.

11. A filter system according to claim 10, wherein expandable pleats of the pleated fiber material are spaced no greater than 5 pleats per inch.

12. A filtering system according to claim 11, wherein the filter cartridge includes sufficient surface area so that the face velocity of the exhaust at the cartridge is not more than 0.75 meters/minute.

13. A filtering system according to claim 9, wherein the filter housing comprises a removable end cap proximate the cartridge end cap.

* * * * *

UNITED STATES PATENT AND TRADEMARK OFFICE
CERTIFICATE OF CORRECTION

PATENT NO. : 5,246,472
DATED : September 21, 1993
INVENTOR(S) : Herman et al.

It is certified that error appears in the above-identified patent and that said Letters Patent is hereby corrected as shown below:

Title page, item [63] under
Related U.S. Application Data [63], "Mar. 20" should be --Mar. 22--.

Column 1, line 6, "Mar. 20" should be --Mar. 22--.

Signed and Sealed this

Fifth Day of April, 1994

Attest:

BRUCE LEHMAN

Attesting Officer

Commissioner of Patents and Trademarks